(12) United States Patent
Parandekar

(10) Patent No.: US 7,817,553 B2
(45) Date of Patent: Oct. 19, 2010

(54) LOCAL AREA NETWORK SERVICES IN A CABLE MODEM NETWORK

(75) Inventor: Harshavardhan Parandekar, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 1031 days.

(21) Appl. No.: 11/126,487

(22) Filed: May 10, 2005

(65) Prior Publication Data

US 2005/0265309 A1    Dec. 1, 2005

Related U.S. Application Data

(60) Provisional application No. 60/574,506, filed on May 25, 2004, provisional application No. 60/574,876, filed on May 26, 2004, provisional application No. 60/582,732, filed on Jun. 22, 2004, provisional application No. 60/588,635, filed on Jul. 16, 2004, provisional application No. 60/590,509, filed on Jul. 23, 2004.

(51) Int. Cl.
  *H04J 1/16*    (2006.01)
  *H04L 12/26*   (2006.01)

(52) U.S. Cl. .................................................. 370/235

(58) Field of Classification Search ........................ None
See application file for complete search history.

(56) References Cited

U.S. PATENT DOCUMENTS

| | | |
|---|---|---|
| 4,977,593 A | 12/1990 | Ballance |
| 5,153,763 A | 10/1992 | Pidgeon |
| 5,457,678 A | 10/1995 | Goeldner |
| 5,604,735 A | 2/1997 | Levinson et al. |
| 5,724,510 A | 3/1998 | Arndt et al. |
| 5,784,597 A | 7/1998 | Chiu et al. |
| 5,805,602 A | 9/1998 | Cloutier et al. |
| 5,918,019 A | 6/1999 | Valencia |
| 5,931,954 A | 8/1999 | Hoshina et al. |
| 5,933,420 A | 8/1999 | Jaszewski et al. |
| 5,963,557 A | 10/1999 | Eng |

(Continued)

FOREIGN PATENT DOCUMENTS

WO    0072509    11/2000

(Continued)

OTHER PUBLICATIONS

U.S. Appl. No. 11/131,766, filed May 17, 2005, Chapman et al.

(Continued)

*Primary Examiner*—William Trost, IV
*Assistant Examiner*—Raj Jain
(74) *Attorney, Agent, or Firm*—Stolowitz Ford Cowger LLP

(57) ABSTRACT

A network device has a network interface to allow the device to send and receive traffic across a network. The device also has a cable connection to allow the device to exchange data with at least one other device across a cable network. The device has a processor to receive traffic having a network identifier through the network interface and determine if the network identifier is associated with a virtual private network. If the network identifier is associated with a virtual private network, the device then routes the traffic to an appropriate receiving entity through the cable connection if the network identifier is associated with a local are network.

13 Claims, 4 Drawing Sheets

U.S. PATENT DOCUMENTS

| | | | |
|---|---|---|---|
| 6,023,769 A | 2/2000 | Gonzalez | |
| 6,078,595 A | 6/2000 | Jones et al. | |
| 6,101,180 A | 8/2000 | Donahue et al. | |
| 6,137,793 A | 10/2000 | Gorman et al. | |
| 6,233,235 B1 | 5/2001 | Burke et al. | |
| 6,233,246 B1 | 5/2001 | Hareski et al. | |
| 6,275,990 B1 | 8/2001 | Dapper et al. | |
| 6,381,214 B1 | 4/2002 | Prasad | |
| 6,418,324 B1 | 7/2002 | Doviak et al. | |
| 6,434,141 B1 | 8/2002 | Oz et al. | |
| 6,438,123 B1 | 8/2002 | Chapman | |
| 6,490,727 B1 | 12/2002 | Nazarathy et al. | |
| 6,510,162 B1 | 1/2003 | Fijolek et al. | |
| 6,516,345 B1 | 2/2003 | Kracht | |
| 6,546,017 B1 | 4/2003 | Khaunte | |
| 6,556,591 B2 | 4/2003 | Bernath et al. | |
| 6,640,248 B1 | 10/2003 | Jorgensen | |
| 6,693,878 B1 * | 2/2004 | Daruwalla et al. | 370/235 |
| 6,697,970 B1 | 2/2004 | Chisholm | |
| 6,698,022 B1 | 2/2004 | Wu | |
| 6,763,019 B2 | 7/2004 | Mehta et al. | |
| 6,763,032 B1 | 7/2004 | Rabenko et al. | |
| 6,771,606 B1 | 8/2004 | Kuan | |
| 6,804,251 B1 | 10/2004 | Limb et al. | |
| 6,819,682 B1 | 11/2004 | Rabenko et al. | |
| 6,847,635 B1 | 1/2005 | Beser | |
| 6,853,680 B1 | 2/2005 | Nikolich | |
| 6,857,132 B1 | 2/2005 | Rakib et al. | |
| 6,901,079 B1 | 5/2005 | Phadnis et al. | |
| 6,950,399 B1 | 9/2005 | Bushmitch et al. | |
| 6,959,042 B1 | 10/2005 | Liu et al. | |
| 6,993,016 B1 | 1/2006 | Liva et al. | |
| 6,993,353 B2 | 1/2006 | Desai et al. | |
| 6,996,129 B2 | 2/2006 | Krause et al. | |
| 7,006,500 B1 | 2/2006 | Pedersen et al. | |
| 7,007,296 B2 | 2/2006 | Rakib et al. | |
| 7,023,882 B2 | 4/2006 | Woodward, Jr. et al. | |
| 7,039,049 B1 | 5/2006 | Akgun et al. | |
| 7,065,779 B1 | 6/2006 | Crocker et al. | |
| 7,067,734 B2 | 6/2006 | Abe et al. | |
| 7,110,398 B2 | 9/2006 | Grand et al. | |
| 7,113,484 B1 | 9/2006 | Chapman et al. | |
| 7,116,643 B2 | 10/2006 | Huang et al. | |
| 7,117,526 B1 * | 10/2006 | Short | 726/5 |
| 7,139,923 B1 | 11/2006 | Chapman et al. | |
| 7,145,887 B1 | 12/2006 | Akgun | |
| 7,149,223 B2 | 12/2006 | Liva et al. | |
| 7,161,945 B1 | 1/2007 | Cummings | |
| 7,164,690 B2 | 1/2007 | Limb et al. | |
| 7,197,052 B1 * | 3/2007 | Crocker | 370/474 |
| 7,206,321 B1 | 4/2007 | Bansal et al. | |
| 7,209,442 B1 | 4/2007 | Chapman | |
| 7,269,159 B1 | 9/2007 | Lai | |
| 7,290,046 B1 | 10/2007 | Kumar | |
| 7,359,332 B2 | 4/2008 | Kolze et al. | |
| 7,363,629 B2 | 4/2008 | Springer et al. | |
| 7,548,558 B2 | 6/2009 | Rakib et al. | |
| 2001/0010096 A1 | 7/2001 | Horton et al. | |
| 2001/0055319 A1 | 12/2001 | Quigley et al. | |
| 2001/0055469 A1 | 12/2001 | Shida et al. | |
| 2002/0009974 A1 | 1/2002 | Kuwahara et al. | |
| 2002/0010750 A1 | 1/2002 | Baretzki | |
| 2002/0023174 A1 | 2/2002 | Garret et al. | |
| 2002/0052927 A1 | 5/2002 | Park | |
| 2002/0067721 A1 | 6/2002 | Kye | |
| 2002/0073432 A1 | 6/2002 | Kolze | |
| 2002/0073433 A1 | 6/2002 | Furuta et al. | |
| 2002/0088003 A1 | 7/2002 | Salee | |
| 2002/0093935 A1 | 7/2002 | Denney et al. | |
| 2002/0093955 A1 | 7/2002 | Grand et al. | |
| 2002/0131403 A1 | 9/2002 | Desai et al. | |
| 2002/0131426 A1 | 9/2002 | Amit et al. | |
| 2002/0133618 A1 * | 9/2002 | Desai et al. | 709/238 |
| 2002/0136203 A1 | 9/2002 | Liva et al. | |
| 2002/0141585 A1 | 10/2002 | Carr | |
| 2002/0144284 A1 | 10/2002 | Burroughs et al. | |
| 2002/0146010 A1 | 10/2002 | Shenoi et al. | |
| 2002/0147978 A1 | 10/2002 | Dolgonos et al. | |
| 2002/0154655 A1 | 10/2002 | Gummalla et al. | |
| 2002/0161924 A1 | 10/2002 | Perrin et al. | |
| 2002/0198967 A1 | 12/2002 | Iwanojko et al. | |
| 2003/0014762 A1 | 1/2003 | Conover et al. | |
| 2003/0058794 A1 | 3/2003 | Pantelias et al. | |
| 2003/0061415 A1 | 3/2003 | Horton et al. | |
| 2003/0066087 A1 | 4/2003 | Sawyer et al. | |
| 2003/0067944 A1 | 4/2003 | Sala et al. | |
| 2003/0101463 A1 * | 5/2003 | Greene et al. | 725/111 |
| 2003/0140131 A1 * | 7/2003 | Chandrashekhar et al. | 709/223 |
| 2003/0163341 A1 | 8/2003 | Banerjee et al. | |
| 2003/0214943 A1 | 11/2003 | Engstrom et al. | |
| 2003/0214982 A1 | 11/2003 | Lorek et al. | |
| 2004/0039466 A1 | 2/2004 | Lilly et al. | |
| 2004/0045037 A1 | 3/2004 | Cummings et al. | |
| 2004/0073902 A1 | 4/2004 | Kao et al. | |
| 2004/0101077 A1 | 5/2004 | Miller et al. | |
| 2004/0105403 A1 | 6/2004 | Lin et al. | |
| 2004/0105406 A1 | 6/2004 | Kayama et al. | |
| 2004/0143593 A1 | 7/2004 | Le Maut et al. | |
| 2004/0160945 A1 | 8/2004 | Dong et al. | |
| 2004/0163129 A1 | 8/2004 | Chapman et al. | |
| 2004/0181800 A1 | 9/2004 | Rakib et al. | |
| 2004/0244043 A1 | 12/2004 | Lind et al. | |
| 2004/0248530 A1 | 12/2004 | Rakib et al. | |
| 2005/0018697 A1 | 1/2005 | Enns et al. | |
| 2005/0122976 A1 | 6/2005 | Poli et al. | |
| 2005/0138669 A1 | 6/2005 | Baran | |
| 2005/0198684 A1 | 9/2005 | Stone et al. | |
| 2005/0201399 A1 | 9/2005 | Woodward, Jr. et al. | |
| 2005/0220126 A1 | 10/2005 | Gervais et al. | |
| 2005/0226257 A1 * | 10/2005 | Mirzabegian et al. | 370/401 |
| 2005/0232294 A1 | 10/2005 | Quigley et al. | |
| 2005/0259645 A1 | 11/2005 | Chen et al. | |
| 2005/0265261 A1 | 12/2005 | Droms et al. | |
| 2005/0265309 A1 | 12/2005 | Parandekar | |
| 2005/0265338 A1 | 12/2005 | Chapman et al. | |
| 2005/0265376 A1 | 12/2005 | Chapman et al. | |
| 2005/0265392 A1 | 12/2005 | Chapman et al. | |
| 2005/0265394 A1 | 12/2005 | Chapman et al. | |
| 2005/0265397 A1 | 12/2005 | Chapman et al. | |
| 2005/0265398 A1 | 12/2005 | Chapman et al. | |
| 2005/0289623 A1 | 12/2005 | Midani et al. | |
| 2006/0002294 A1 | 1/2006 | Chapman et al. | |
| 2006/0098669 A1 | 5/2006 | Enns et al. | |
| 2006/0126660 A1 | 6/2006 | Denney et al. | |
| 2006/0159100 A1 | 7/2006 | Droms et al. | |
| 2006/0168612 A1 | 7/2006 | Chapman et al. | |
| 2007/0274345 A1 | 11/2007 | Taylor et al. | |
| 2008/0037545 A1 | 2/2008 | Lansing et al. | |

FOREIGN PATENT DOCUMENTS

| | | |
|---|---|---|
| WO | 2005117310 | 12/2005 |
| WO | 2005117358 | 12/2005 |

OTHER PUBLICATIONS

U.S. Appl. No. 11/135,777, filed May 23, 2005, Chapman et al.
U.S. Appl. No. 11/137,606, filed May 24, 2005, Chapman et al.
Postel, J., "User Datagram Protocol", RFC 768, Aug. 28, 1980, 3 pgs.
Postel, Jon, Editor, "DARPA Internet Program Protocol Specification", RFC 791, Sep. 1981, 45 pages.
Deering, S., "Host Extensions for IP Multicasting", RFC 1112, Aug. 1989.
Droms, R., "Dynamic Host Configuration Protocol", RFC 2131, Mar. 1997.

Townsley, W., et al., "Layer Two Tunneling Protocol "L2TP"", RFC 2661, Aug. 1999, 80 pages.
Cable Television Laboratories, Inc., "Data-Over-Cable Service Interface Specifications DOCSIS 2.0, Radio Frequency Specification", SP-RFIv2.0-I04-030730, 1999-2003, 488 pages.
Cable Television Laboratories, Inc., "Data-Over-Cable Service Interface Specifications DOCSIS 2.0, Radio Frequency Interface Specification", CM-SP-RFIv2.0-I08-050408, Annex C, pp. 339-390, Copyright 1999-2005.
Cable Television Laboratories, Inc., "Data-Over-Cable Service Interface Specifications DOCSIS 2.0, Radio Frequency Specification", CM-SP-RFIv2.0-I09-050812, 1999-2005, 534 pages.
Cable Television Laboratories, Inc., "DOCSIS® Set-top Gateway (DSG) Interface Specification" CM-SP-DSG-I02-040804, Copyright 2001-2004.
Cable Television Laboratories, Inc., "DOCSIS® Set-top Gateway (DSG) Interface Specification" CM-SP-DSG-I04-050408, Copyright 2001-2005.
Bhattacharyya, et al., "An Overview of Source-Specific Multicast (SSM)", RFC 3569, Jul. 2003.
Droms, R., et al., "Dynamic Host Configuration Protocol for IPv6 (DHCPv6)", RFC 3315, Jul. 2003.
Droms, R., "Stateless Dynamic Host Configuration Protocol (DHCP) Service for IPv6", RFC 3736, Apr. 2004.
Cisco Systems, Inc., DHCP and the DOCSIS Configuration File for Cable Modems (DOCSIS 1.0), Document ID: 10961, Sep. 16, 2004.
IEEE Standards, "802.16, IEEE Standard for Local and Metropolitan Area Networks, Part 16: Air Interface for Fixed Broadband Wireless Access Systems", IEEE Std. 802.16—2004, Oct. 1, 2004, 893 pages.
Cable Television Laboratories, Inc., "Data-Over-Cable Service Interface Specifications Modular CMTS", CM-SP-DEPI-W03-050302, 49 pgs., Copyright 2005.
Lau, J., et al., "Layer Two Tunneling Protocol—Version 3 (L2TPv3)," RFC 3931, Mar. 2005, 94 pages.
Chapman, John T., "CMTS Remote PHY for a DOCSIS Network: DMPI Over IP Protocol Specification", RP-SP-DoIP-D1-040715B.doc, Cisco Systems, Inc., EDCS-387722, May 26, 2004.
Postel, Jon, Editor, "DARPA Internet Program Protocol Specification", RFC 791, Sep. 1981, 45 pages.
Deering, S., "Host Extensions for IP Multicasting", RFC 1112, Aug. 1989.
Droms, R., "Dynamic Host Configuration Protocol", RFC 2131, Mar. 1997.
Adoba, et al. Extensible Authentication Protocol (EAP), RFC 3748, Jun. 2004, pp. 1-64, Standards Track.
ITU-T Telecommunications Standardization Sector of ITU, Series J: Cable Networks and Transmission of Television, Sound Programme and other Multimedia Signals, Interactive Systems for Digital Television Distribution, Recommendation J. 122, Dec. 2002, 506 pages, International Telecommunications Union.
Cable Television Laboratories, Inc., "DOCSIS Radio Frequency Interfaces Specification", CM-SP-RFIv2.0-I10-051209, 538 pgs., Dec. 9, 2005.
Madvinsky, et al., Don't Let Your Modem Be Cloned, Jun. 2000, pp. 1-7, Communications Technology.
Millet, Theft of Service-Inevitable?, Dec. 2005, pp. 1-4, Communications Technology.
ETSI, Data-Over-Cable Systems Part 2 Radio Frequency Interface Specifications, Jan. 2003, pp. 59-66, ES 201 488-2 V1.2.1.
Data Over Cable Service Interface Specification, Aug. 4, 1997.
Ethereal: Display Filter Reference: DOCSIS Upstream Channel Descriptor, Webarchivedate Apr. 27, 2004.
DOCSIS Set Top Gateway (DSG) interface specification, Feb. 28, 2002.
An Overview of Internet Protocols, Dann, Jan. 1998.
Patrick, M.; RFC3046-DHCP Rely Agent Information Option; The Internet Society (2001) http://www.faqs.org/rfcs/rfc3046.html; Jan. 2001; 11 pages.
Cable Television Laboratories, Inc., Interim Specification, Data-Over-Cable Service Interface Specifications, Radio Frequency Specification, SP-RFIv1.1-I02-990731, Jul. 30, 1999, 353 pages.
Cable Television Laboratories, Inc., Interim Specification, Data-Over-Cable Service Interface Specifications, Radio Frequency Interface Specification, SP-RFIv1.1-I04-000407, Apr. 7, 2000, 376 pages.
3COM, High-Speed Cable Internet Solutions, http://www.3com.com/cablenow/pdf/7125dsht.pdf, Dec. 1999, 4 pages.
Phuc H Tran, USPTO Office Action Paper No. 20080427, May 1, 2008, 10 pages.
U.S. Appl. No. 11/292,725, Bernstein et al., "Advanced Multicast Support for Cable", filed Dec. 1, 2005.
Thompson, et al. IPv6 Stateless Address Autoconfiguration, RFC 2462, Dec. 1998, pp. 1-24, Network Working Group.
Thompson, et al. IPv6 Stateless Address Autoconfiguration, RFC 4862, Sep. 2007, pp. 1-29, Network Working Group.
Hawa et al., "Quality of Service Scheduling in Cable and Broadband Wireless Access Systems," at http://www.ittc.ku.edu/publications/documents/Hawa2002_iwqos_paper.pdf, downloaded on Sep. 29, 2008.
Ramakrishnan, Sangeeta, "Next Generation Edge—Realizing the vision of shared resources and bandwidth", Jan. 2005, 16 pgs.
Cisco Systems, Inc., "Downstream External PHY Interface Specification", SP-DEPI-W2-041101A.DOC, EDCS-408926, Oct. 29, 2004.
Chapman, John T., "Remote PHY Technical White Paper Addendum," Downstream External PHY Interface Specification, Cisco Systems, Inc., EDCS-377253, Oct. 1, 2004.
Desai, et al., FastChannel: A Higher-Speed Cable Data Service, AT&T Labs-Research, pp. 1-13, Jan. 2002.
Fellows et al., "DOCSIS Cable Modem Technology", IEEE Communication Magazine, vol. 39, Issue 3, Mar. 2001, pp. 202-209.

* cited by examiner

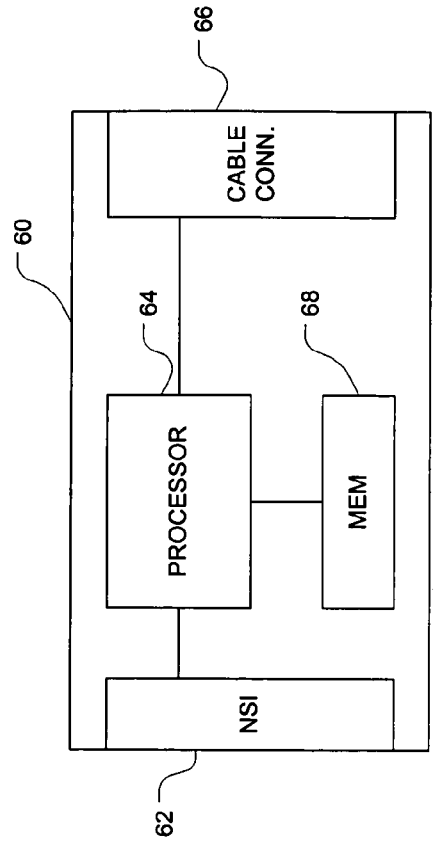
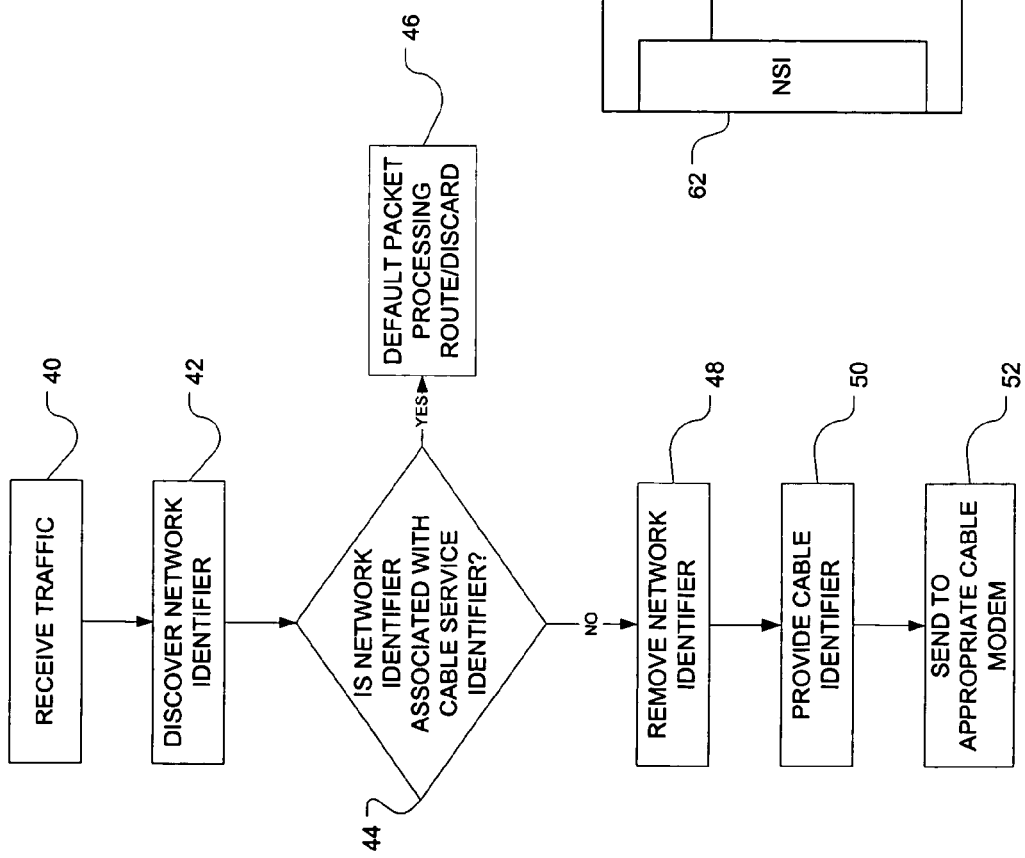
Figure 5
Figure 4

LOCAL AREA NETWORK SERVICES IN A CABLE MODEM NETWORK

RELATED APPLICATIONS

This application is a continuation of, and claims priority to, the following provisional patent applications: 60/574,506, filed May 25, 2004; 60/574,876, filed May 26, 2004; 60/582,732, filed Jun. 22, 2004; 60/588,635, filed Jul. 16, 2004; and 60/590,509, filed Jul. 23, 2004.

BACKGROUND

Cable modems provide customers with high-speed access to networks, such as the Internet. Generally, the typical cable modem user is a home user, desiring connection to the Internet. However, many small businesses are discovering that cable modems provide them with a reasonable solution for Internet access. Some small businesses have even begun to deploy voice data over cable modems as an alternative to dedicated telephone lines.

Cable modems connect to a network through a Cable Modem Termination Server (CMTS). This provides connection to the Internet, and switching and routing of data packets. For a small business that only has one office, a single cable modem may be able to provide service for the entire office, through one CMTS.

If a small business has more than one office, and each office has its own cable modem, there may be more than one CMTS involved in providing network services to the business. For small business desiring 'layer 2' local area network (LAN) services, this causes problems. The CMTS may be able to provide 'layer 3' services for the individual cable modems, but not layer 2 services. These may include, but are not limited to, support for non-Internet Protocol (IP) version 4 protocols (currently provided by layer 3 services), end-to-end encryption, higher levels of network control, and use of a private IP address space.

SUMMARY

One embodiment is a network device having a network interface to allow the device to send and receive traffic across a network. The device also has a cable connection to allow the device to exchange data with at least one other device across a cable network. The device has a processor to receive traffic having a network identifier through the network interface and determine if the network identifier is associated with a virtual private network. If the network identifier is associated with a virtual private network, the device then routes the traffic to an appropriate receiving entity through the cable connection if the network identifier is associated with a local are network.

In one embodiment the network device is an aggregator.

In one embodiment the network device is a cable modem termination server.

BRIEF DESCRIPTION OF THE DRAWINGS

Embodiments of the invention may be best understood by reading the disclosure with reference to the drawings, wherein:

FIG. 4 shows an embodiment of a method to provide local area network services for received traffic at a cable modem termination server.

FIG. 5 shows an embodiment of a network device capable of providing local area network services.

DETAILED DESCRIPTION OF THE EMBODIMENTS

Figure 1:
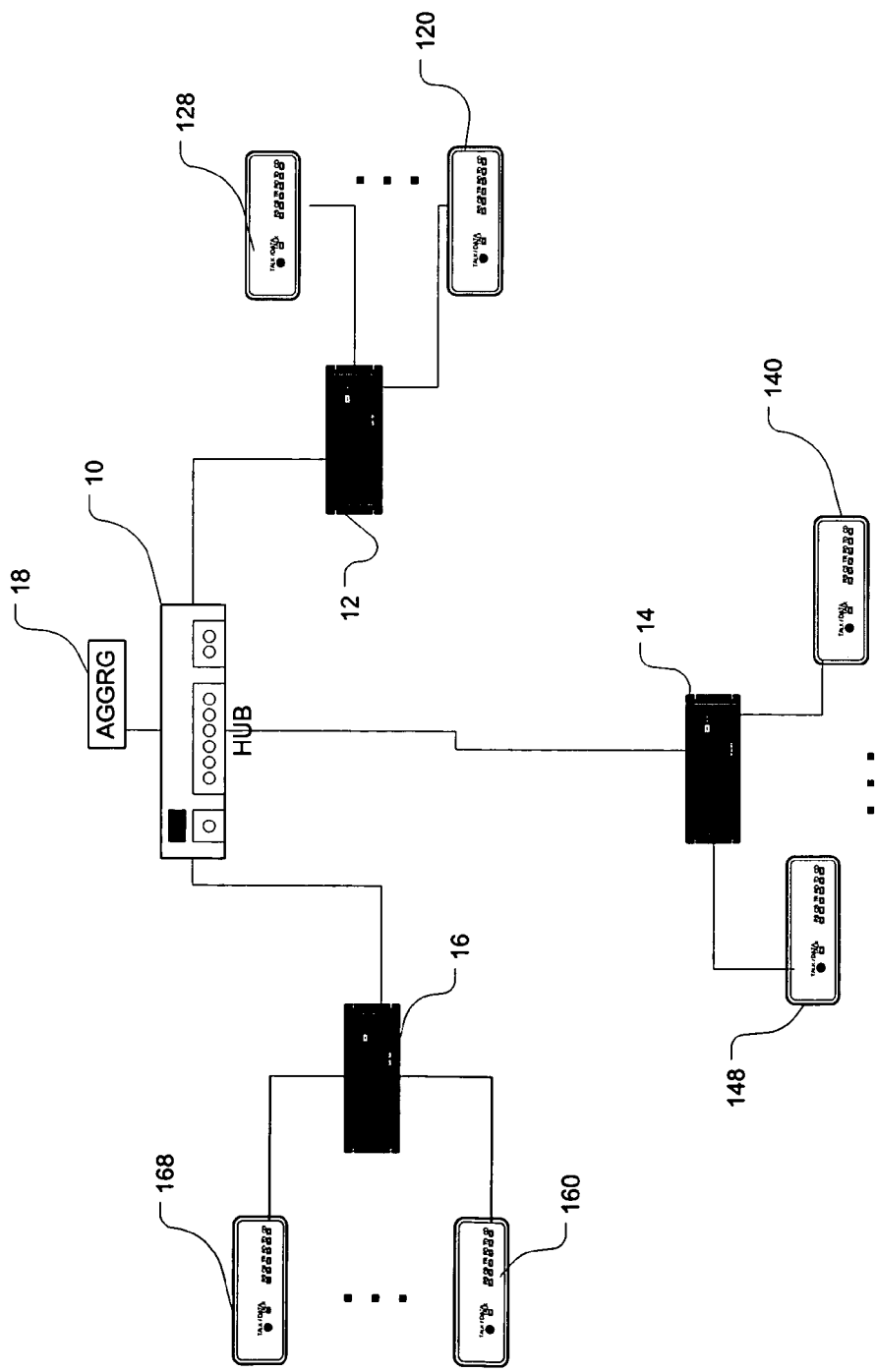
FIG. 1 shows an embodiment of a cable modem network having a hub-and-spoke local area network services architecture.

An embodiment of a cable modem network having a hub-and-spoke architecture is shown in FIG. 1. In this particular embodiment, the cable network is comprised of several cable modem termination servers (CMTS) 12, 14 and 16, in communication with a hub 10, also referred to as a 'head-end.' The CMTS each have a number of cable modems, such as 120 and 128, attached to them. The CMTSes provide network connection for the cable modems.

As discussed above, there may be several users using one cable modem, several cable modems attached to on CMTS and several CMTSes attached to the hub. While it will generally be true that all of the users on a particular cable modem may be associated with one particular customer, there may be several different customers using one cable modem. A customer, as that term is used here, is any entity with which more than one person is associated. Of particular interest are those customers that have several different sites. No limitation is intended on any combination of customers on cable modems and CMTSes. The cable network may also have several hubs.

The hub or head-end 10 may belong to a multiple service operator (MSO) that provides voice, data and television service across the cable modem network. The CMTSes 12, 14 and 16 allow the cable modem users to access larger networks, such as the Internet. For ease of discussion, and with no intention of limiting application of the invention, it will be assumed that cable modems 120, 140 and 160 belong to Customer A, and cable modems 128, 148 and 168 belong to Customer B.

These customers now have three sites, each with their own cable modems, but no way to provide local area network (LAN) services, such as those to ensure security, between the users at the different sites. With application of embodiments of this invention, the users will have the ability to use LAN services. For example, users employing cable modem 120 will be able to send e-mail and data to users at cable modem 140 securely and with no concern that users at cable modem 148 or 128 can 'see' the data or access it.

In this embodiment, a network device 18 resides within the hub 10. This device may be referred to as an aggregator provider edge device or simply as an aggregator, with no intention of limiting the nature or composition of this device. When traffic from a CMTS enters the hub, the network device 18 will identify from what customer's cable modem/user that traffic originated and will forward it only to those cable modems belonging to that customer. In some ways, then, the network device 18 could be seen as performing bridging, where the users at cable modems 120, 140 and 160 could be viewed as one bridge group, and the users at cable modems 128, 148 and 168 could be viewed as another bridge group.

As mentioned before, it is possible to set up virtual private network (VPN) solutions using what is referred to as "layer 3" switching. Layer 3 refers to the OSI (Open System Interconnection) reference model, in which Layer 3 is the network layer. In usage, this generally refers to the network switching layer. A VPN using layer 3 switching generally only supports Internet Protocol traffic, and requires the customers to share their network addressing information with the cable service provider or MSO.

A Layer 2 VPN can provide similar functionality without the drawbacks of a Layer 3 solution. Layer 2 is the data link layer, and may also be broken into a media access control (MAC) layer and a logical link layer. Examples of Layer 2 implementations include L2TP (Layer 2 Tunneling Protocol), currently on version 3 (L2TPv3), and AToM. AToM is Any Transport over MPLS, where MPLS is the Multiprotocol Label Switching, a protocol that uses labels to direct routers and other network devices how data traffic having a particular label is to be routed.

In one embodiment of this invention, the network identifier may be based on a 'pseudo-wire' or tunnel using L2TPv3 or AToM, as examples, which is established between each CMTS and the aggregator for each cable modem attached to the CMTS. If for example, CMTS 12 had 1000 cable modems requiring Layer 2 VPN services attached to it, there would be 1000 pseudo-wires established. The 'width' of the connection between CMTS 12 and aggregator 10 would have a width of n1=1000. This would be repeated for every CMTS attached to the aggregator. In an alternative embodiment, the hub is a network over which the pseudo wires traverse such as a Virtual Private LAN Services (VPLS) cloud. In this case the hub and spoke topology would be implementing Hierarchical VPLS or HVPLS.

Figure 2:
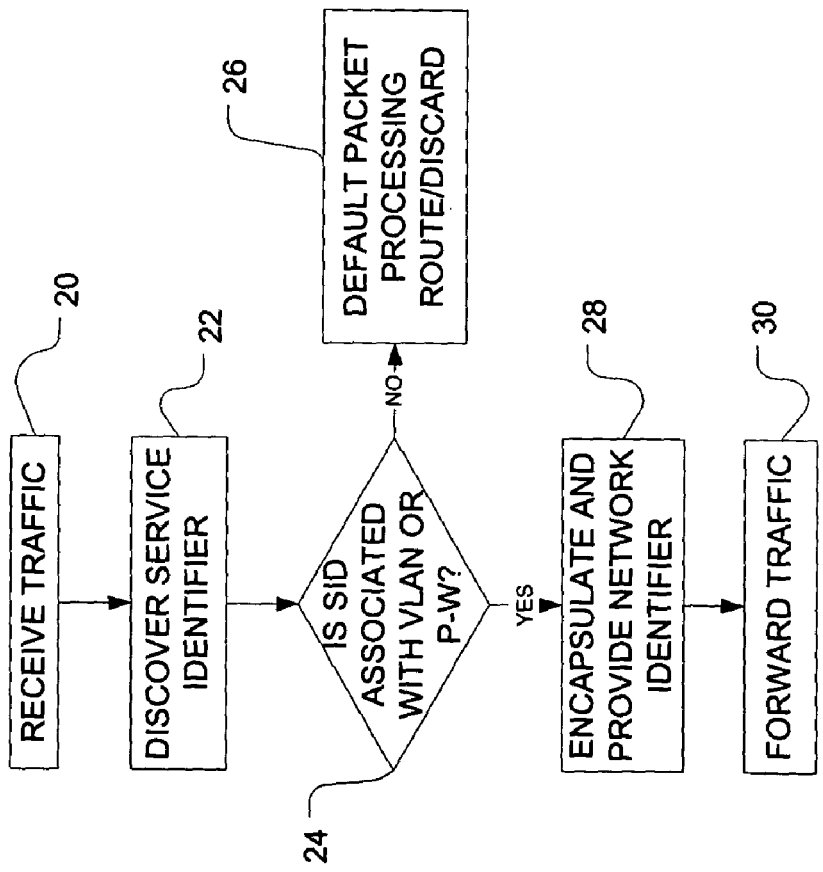
FIG. 2 shows an embodiment of a method to provide local area network services for transmitted traffic from a cable modem.
Figure 6:
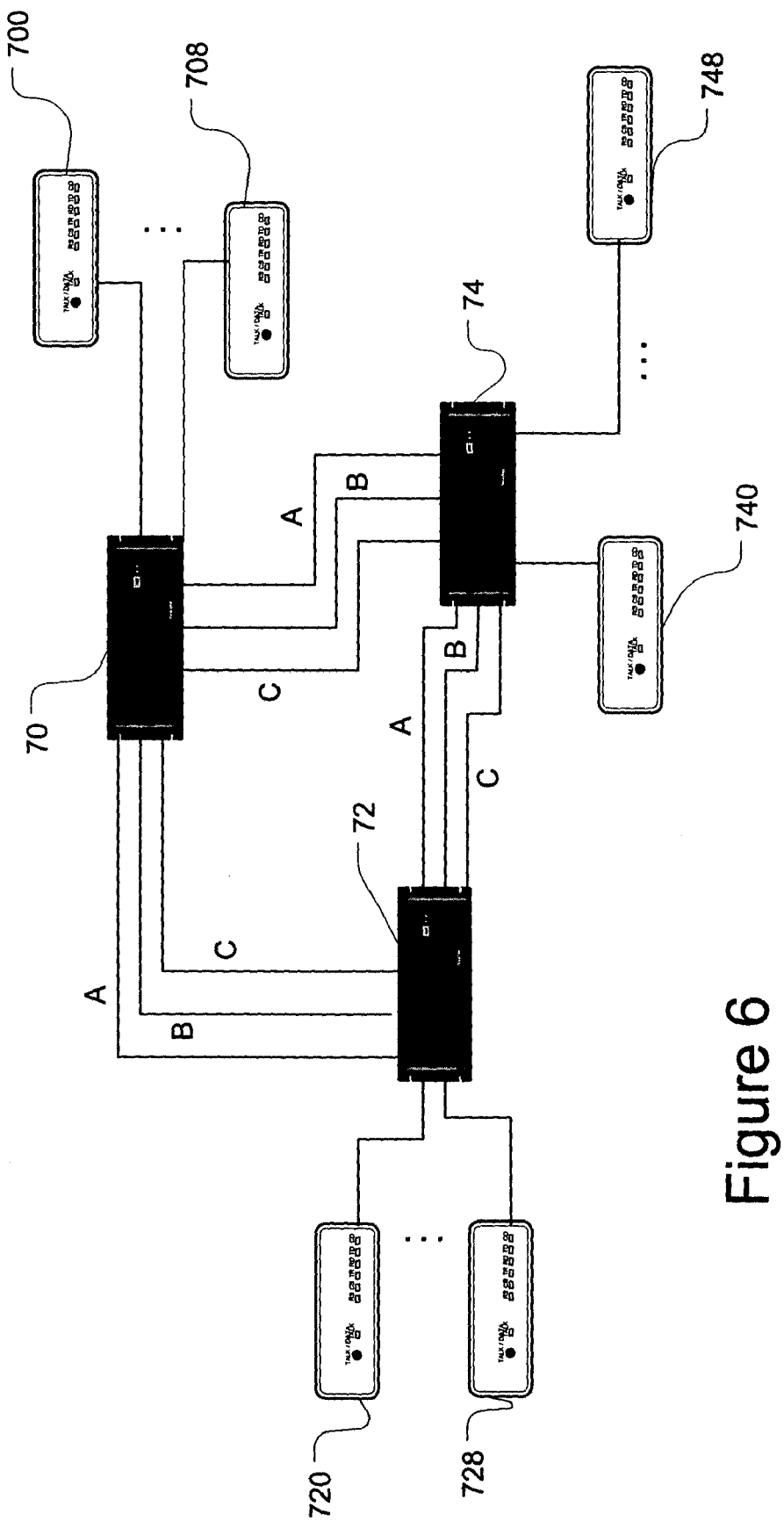
FIG. 6 shows an embodiment of a cable modem network having fully-meshed local area network services architecture.

An embodiment of a method to provide local area network services for transmitted data from a cable modem is shown in flowchart form in FIG. 2. At 20, the CMTS receives traffic from the cable modem. The CMTS determines the upstream service identifier (SID) and the MAC address associated with the traffic at 22. If the MAC address matches that of the transmitting cable modem, the traffic is routed 'otherwise' such as through Internet Protocol (IP) routing at 26. If the MAC address is not that of the cable modem, and the SID is associated with a pseudo-wire, also called a tunnel, on the network side interface, the CMTS encapsulates the traffic and provides a network identifier at 28. The traffic is then forwarded at 30.

The network identifier may be a VLAN tag, pseudo-wire tag, or other label that identifies the pseudo-wire through which the traffic is to be routed. One customer may have several different pseudo-wires, and therefore several different VLAN or other network identifiers, associated with their sites. A VLAN is a similar pseudo-wire to L2TPv2 and AToM. Network identifiers refer to the virtual private network with which that cable modem traffic is associated.

Figure 3:
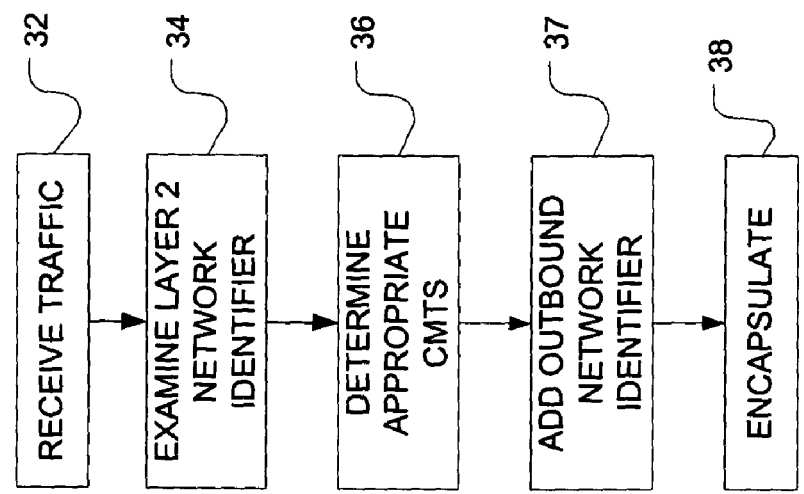
FIG. 3 shows an embodiment of a method to provide local area network services for received traffic at an aggregator.

In one embodiment, where there is a hub, aggregator or other centralized entity, such as the network mentioned above, the received traffic may be processed as shown in FIG. 3. The traffic is received at the hub at 32. As will be discussed later, alternatives to the centralized entity exist. At 34, the hub examines the LAYER 2 network identifier, such as the VLAN tag. This is more than likely done through a mapping table of identifiers to pseudo-wires. The mapping then provides the hub with the appropriate pseudo-wire for that traffic, based upon the destination CMTS at 36. The hub then provides the necessary outbound identifier, in this case an outbound layer 2 network identifier at 37. The traffic is then forwarded to the appropriate CMTS at 38.

An embodiment of a method of processing received local area network traffic at a CMTS is shown in flowchart form in FIG. 4. The traffic is received at a CMTS, such as CMTS 14 for example, at 40. The CMTS discovers the network identifier, such as the VLAN tag. It must be noted that the term 'network identifier' as used here, does not identify a network, but is the identifier used to tag the traffic in a manner compatible with the network type. For example, as discussed above, the identifier may be a VLAN tag for an Ethernet network.

The CMTS then performs a look-up to determine if that VLAN tag is then associated with a virtual private network, typically by determining if it is associated with a downstream service identifier (SID) at 44. In cable networks, generally, downstream refers to data coming from the hub or network towards the CMTS and the cable modem, and upstream is data coming from the cable modems or the CMTSes towards the hub or the network.

If the identifier does not match at 44, the traffic may be discarded or otherwise routed at 46. The network may employ different manners of correcting errors in transmission, either bad tags or incorrect routing. The nature and extensiveness of any error correction measures implemented upon the detection of an unmatchable tag are beyond the scope of this disclosure.

If the network identifier, such as the VLAN tag, matches the identifier of a cable modem on the cable connection of the CMTS at 44, the network identifier is removed at 48. A cable modem header or identifier is then attached at 50. This is similar to the outbound layer 2 network identifier for the aggregator example given previously. In some embodiments, this cable identifier may be a DOCSIS (Data Over Cable Services Interface Specification) header. DOCSIS is the current guiding specification for data over cable modem networks with which most cable equipment and network providers comply. The DOCSIS header will typically be generated with the appropriate SID and the traffic will be sent downstream to the appropriate cable modem at 52.

The processing of received local area network traffic at either the CMTS or the aggregator have some processes in common. The network device receives the traffic, discovers and/or examines the network identifier. The network device then determines if there is a virtual private network associated with that identifier, as either represented by an associated cable service identifier in the case of a CMTS, or by the VLAN or pseudo-wire tag in the case of the hub/aggregator. An outbound identifier, either an outbound layer 2 network identifier, or a service identifier, is then provided to the outbound traffic. The traffic is then routed to the appropriate receiving entity. The traffic may be altered as needed in the case of a CMTS, but both devices forward the data to the appropriate recipient.

As mentioned above, the bridging task, that of mapping from the network identifier to the appropriate CMTS, is performed at a centralized entity. In a fully-meshed architecture, where each CMTS has a pseudo-wire for every customer and every other CMTS, the CMTS may perform the bridging function directly. The traffic does not flow back to the hub, but is handled by each CMTS. Referring to FIG. 2, the functions contained in box 38 would be performed by the CMTS, rather than the hub.

An embodiment of a network device is shown in FIG. 4. The device 60 has a communications port or interface 62 for providing connection and communication with the network, such as the Internet. This may also be referred to as the network side interface as it is the interface through which the network device receives the network traffic or routes the traffic to the network.

A processor 64 performs the tasks of converting the traffic from cable traffic to network traffic or the reverse and providing the traffic with the correct routing based upon the service identifier or the network identifier. The service identifier will be used in embodiments where the network device is a CMTS, ensuring that the data is routed to the correct cable modem on the pseudo-wire. The network identifier may be used in embodiments where the network device is an aggregator. The conversion may involve a look up process, where the database or table being queried resides in the memory 68.

The cable connection 66 allows the device to communicate with the cable modems or the CMTS, depending upon whether the network device is a CMTS, which communicates with cable modems, or an aggregator that communicates with the CMTSes.

In the case of the aggregator that communicates with the CMTSes, the cable connection may be the same as the network connection or interface. As the CMTS functions generally to connect cable modems to a larger network, such as the Internet, and may use network protocols, the cable connection used by the aggregator to communicate with the CMTS may be the same type of interface as the outbound interface on the aggregator.

As discussed above, the network device providing the bridging function between the pseudo-wires may be the CMTS in the case of a fully meshed architecture. An embodiment of such an architecture is shown in FIG. 5 with regard to CMTSes 12 and 14 from FIG. 1. In this architecture, there is a pseudo-wire between the CMTSes for each customer VPN communicating through a particular CMTS. As discussed above, in one example cable modems 120 and 140 belong to Customer A and cable modems 128 and 148 belong to Customer B.

In FIG. 5, for each Layer 2 VPN customer, a pseudo-wire is established between each CMTS. In FIG. 5, CMTS 70, 72 and 74, each has two connections per customer VLAN. CMTS 70 has a pseudo-wire between itself and CMTS 72 for Customer A, Customer B and Customer C, with a similar configuration for CMTS 70 to CMTS 74. In this manner, each customer would be provided LAN services in a fully-meshed architecture.

The CMTSes receive the cable modem to pseudo-wire mapping, or a cable modem to virtual private network mapping, where the pseudo-wires are associated with virtual private networks. This mapping is used to assign the network identifiers based upon the virtual private networks with which the cable modems are associated. This may be true for either the fully-meshed embodiment or the hub-and-spoke embodiment, upon registration of the cable modem with the CMTS through the CM configuration file, for example. Alternatively, the CMTS queries another server, such as a RADIUS (Remote Access Dial In User Services) server, using the cable modem MAC address. The pseudo-wire mapping for that CM can then be provided by the other server for download by the CMTS.

In either embodiment, the cable modem customers would receive LAN services across the cable network. This provides smaller entities with several sites the ability to use the cable network for connectivity, and still provides the features of having a LAN that would otherwise be unavailable for them. In order to ensure privacy of VPN traffic over the shared cable downstream we need to ensure that traffic cannot 'leak' into or out of the VPN.

To ensure that traffic does not leak out of the VPN, the CMTS must encrypt all downstream traffic belonging to the VPN. To ensure that traffic within the VPN does not leak out, the CMTS can use one encryption key per CM in the VPN for unicast traffic and a separate encryption key per VPN for non-unicast traffic based on the Baseline Privacy Interface (BPI) defined in DOCSIS. This ensures that unicast as well as multicast and broadcast traffic will not be visible to any CM that does not belong to that VPN.

The harder problem to solve is ensuring that non VPN traffic does not enter into the VPN. Today unencrypted non-VPN traffic can potentially be forwarded into the VPN network by a CM because the CM bases its forwarding decision on the downstream only on the destination mac address. If the destination mac address of the non-VPN traffic happens to overlap with a CPE device inside the VPN, the CM may incorrectly consider the traffic to be destined to that CPE and forward it into the VPN.

This incorrect forwarding can be avoided by adding a feature to the CM such that only encrypted packets are considered for forwarding by the CMs belonging to a VPN. Since all the traffic within the VPN is encrypted and the CMs have the decryption keys for that traffic, only that traffic would be forwarded by the CM. Unencrypted traffic that doesn't belong to any VPN or encrypted traffic (using a different key) that belong to a different VPN will be dropped by the CM.

Although there has been described to this point a particular embodiment for a method and apparatus for LAN services over a cable network, it is not intended that such specific references be considered as limitations upon the scope of this invention except in-so-far as set forth in the following claims.

What is claimed is:

1. A system having an aggregation device and a Cable Modem Termination System (CMTS), the system comprising:

CMTS circuitry located on the CMTS, the CMTS circuitry configured to:

analyze a communication received over an upstream communication path that extends from the CMTS to an originating cable modem to identify a service identifier (SID) associated with the received upstream communication;

compare the identified SID to a table mapping SIDs to Virtual Local Area Network (VLAN) tags;

attach one of the VLAN tags from the table to the communication according to the comparison;

forward the communication having the attached VLAN tag over a network to the aggregation device; and aggregation device circuitry located on the aggregation device, the aggregation device circuitry configured to:

receive the forwarded communication and identify the VLAN tag attached thereto;

select a particular tunnel from a plurality of tunnels extending from the aggregation device to a plurality of CMTSs according to the identified VLAN tag; and send the communication over the selected one of the tunnels.

2. The system of claim 1, wherein a destination CMTS receives the communication forwarded from the aggregation device over the selected one of the tunnels and routes the communication over a tunnel corresponding to a destination cable modem.

3. The system of claim 1, wherein the forwarding from the receiving CMTS to the aggregation device, and then from the aggregation device to a destination CMTS, allows two cable modems that are serviced by different CMTSs to operate in a same Virtual Private Network (VPN).

4. The system of claim 1, wherein a destination CMTS is configured to forward the communication over a tunnel extending from the destination CMTS to a destination cable modem.

5. An apparatus, comprising:

a table to associate service identifiers (SIDs) with tunnel identifiers; and circuitry configured to:

analyze a received upstream communication to identify an SID associated with that received upstream communication;

compare the identified SID to the table, and, according to the comparison, map a tunnel identifier from the table to the identified SID; and attach the mapped tunnel identifier to the communication, and forward the communication having the mapped tunnel identifier attached thereto to a remote aggregation device, wherein the tunnel identifier attached to the communication identifies one of a plurality of tunnels extending from the aggregation device to a plurality of Cable Modem Termination Systems (CMTSs) and the tunnel identifier controls which of the tunnels is used by the aggregation device for forwarding the communication.

6. The apparatus of claim 5, wherein the apparatus is contained on a local CMTS and the communication travels from the local CMTS, through the remote aggregation device for remote processing of the tunnel identifier, and to a remote CMTS.

7. The apparatus of claim 5, wherein the mapping of the tunnel identifier to the SID in the table associates the received upstream communication with a particular one of a plurality of Virtual Local Area Networks (VLANs).

8. A system, comprising:

means for mapping a plurality of tunnel identifiers to a plurality of Service IDentifiers (SIDs);

means for comparing a particular SID of a received communication to the mapping means and selecting a particular tunnel identifier according to the comparison; and means for attaching the selected tunnel identifier to the communication before forwarding the communication to an aggregation device, wherein the tunnel identifier attached to the communication identifies one of a plurality of tunnels extending from the aggregation device to a plurality of Cable Modem Termination Systems (CMTSs) and the tunnel identifier controls which of the tunnels is used by the aggregation device for forwarding the communication.

9. The system of claim 8, further comprising:

means for selecting a particular one of the tunnels according to the attached tunnel identifier and forwarding the communication over the selected tunnel.

10. The system of claim 9, further comprising:

means for forwarding the communication to a particular cable modem after the communication passes through the selected tunnel.

11. A system, comprising:

means for analyzing a communication from a Cable Modem Termination System (CMTS) to observe a value of a tunnel identifier attached to the communication; and means for selecting a particular tunnel from a plurality of tunnels extending from an aggregation device to a plurality of CMTSs according to the observed value, wherein the communication is forwarded from the aggregation device to a particular one of the CMTSs over the particular tunnel.

12. The system of claim 11, further comprising:

means for associating a service identifier (SID) of a received upstream communication with a virtual local area network;

means for selecting the tunnel identifier according to the association; and means for attaching the selected tunnel identifier to the communication before forwarding the communication from the CMTS.

13. The system of claim 12, further comprising:

means for removing the tunnel identifier and forwarding the communication to a destination cable modem.

* * * * *

UNITED STATES PATENT AND TRADEMARK OFFICE
CERTIFICATE OF CORRECTION

| | | |
|---|---|---|
| PATENT NO. | : 7,817,553 B2 | |
| APPLICATION NO. | : 11/126487 | |
| DATED | : October 19, 2010 | |
| INVENTOR(S) | : Parandekar | |

It is certified that error appears in the above-identified patent and that said Letters Patent is hereby corrected as shown below:

Title Page, Item (57) Abstract, line 11 please replace "are network" with --area network--.

Signed and Sealed this
Sixteenth Day of August, 2011

David J. Kappos
*Director of the United States Patent and Trademark Office*